(12) United States Patent
Pétrin et al.

(10) Patent No.: US 8,093,901 B2
(45) Date of Patent: Jan. 10, 2012

(54) SWITCHING UNIT ADAPTED FOR COMMUNICATING WITH A PROCESSING UNIT

(75) Inventors: Jean-Pierre Pétrin, Saint-Nicéphore (CA); Benjamin Bélisle, Saint-Nicéphore (CA); Pascal Coderre, Drummondville (CA)

(73) Assignee: JPS Électronique Inc., Drummondville (CA)

( * ) Notice: Subject to any disclaimer, the term of this patent is extended or adjusted under 35 U.S.C. 154(b) by 438 days.

(21) Appl. No.: 12/393,100

(22) Filed: Feb. 26, 2009

(65) Prior Publication Data

US 2009/0230971 A1 Sep. 17, 2009

Related U.S. Application Data

(60) Provisional application No. 61/037,021, filed on Mar. 17, 2008.

(51) Int. Cl.
*G01R 31/327* (2006.01)
(52) U.S. Cl. ........................ 324/415; 324/73.1
(58) Field of Classification Search .................. 324/415, 324/424; 307/116; 336/6, 7
See application file for complete search history.

(56) References Cited

U.S. PATENT DOCUMENTS

| | | | |
|---|---|---|---|
| 4,777,479 A | 10/1988 | Hinckley | |
| 5,844,493 A | 12/1998 | Pohl et al. | |
| 6,138,241 A | 10/2000 | Eckel et al. | |
| 6,297,724 B1 | 10/2001 | Bryans et al. | |
| 6,356,038 B2 | 3/2002 | Bishel | |
| 6,388,563 B1 | 5/2002 | Brown et al. | |
| 6,400,103 B1 | 6/2002 | Adamson | |
| 6,697,757 B2 | 2/2004 | Eckel et al. | |
| 6,750,781 B1 | 6/2004 | Kim | |
| 6,989,499 B2 | 1/2006 | Bortolloni et al. | |
| 7,042,363 B2 | 5/2006 | Katrak et al. | |
| 7,109,668 B2 | 9/2006 | Pogodayev et al. | |
| 2002/0095269 A1 | 7/2002 | Natalini et al. | |
| 2002/0195883 A1 | 12/2002 | Lazzaro | |
| 2005/0146229 A1* | 7/2005 | Lamarche et al. | 307/116 |
| 2005/0286196 A1 | 12/2005 | Hatemata | |
| 2007/0022176 A1* | 1/2007 | Kobayashi | 709/217 |

FOREIGN PATENT DOCUMENTS

| | | |
|---|---|---|
| EP | 1744248 | 1/2007 |
| WO | 03044923 | 5/2003 |

* cited by examiner

*Primary Examiner* — Vincent Q Nguyen
(74) *Attorney, Agent, or Firm* — Alexandre Abecassis; Fasken Martineau DuMoulin LLP (57) ABSTRACT

An intelligent switching unit to be connected with a processing unit is disclosed. The intelligent switching unit includes a switching unit to be actuated by a user, a detection module connected to the switching unit. The detection module detects a signal outputted by the switching unit and provides a detected signal representative of the signal outputted by the switching unit. The intelligent switching unit further comprises a communication module for receiving and transmitting the detected signal to the processing unit.

19 Claims, 9 Drawing Sheets

SWITCHING UNIT ADAPTED FOR COMMUNICATING WITH A PROCESSING UNIT

CROSS REFERENCES TO RELATED APPLICATIONS

This application claims priority of U.S. provisional patent application No. 61/037,021, entitled "SWITCHING UNIT ADAPTED FOR COMMUNICATING WITH A PROCESSING UNIT" that was filed on Mar. 17, 2008, the specification of which is hereby incorporated by reference.

FIELD OF THE INVENTION

The invention relates to electronic circuits. More precisely, this invention pertains to a switching unit adapted for communicating with a processing unit.

BACKGROUND OF THE INVENTION

Monitoring electrical circuits is required in some instances. In fact, in some applications where a failure of electrical circuits can cause heavy damages, a proper monitoring of electrical circuits is mandatory.

Unfortunately, the monitoring of such electrical circuits may be cumbersome for the skilled addressee and require many extra circuits which render the monitoring costly.

Moreover and in the case where many different electrical circuits are to be monitored, such monitoring can require special customization which also renders the monitoring costly.

Finally in basic monitoring schemes, only basic information may be monitored by such circuits such as for instance if a voltage level is "high" or "low" which is also very limited in terms of applicability.

There is a need for a method and apparatus that will overcome at least one of the above-identified drawbacks.

Features of the invention will be apparent from review of the disclosure, drawings and description of the invention below.

BRIEF SUMMARY

The invention provides an intelligent switching unit to be connected with a processing unit, the intelligent switching unit comprising a switching unit to be actuated by a user, a detection module connected to the switching unit, the detection module detecting a signal outputted by the switching unit and providing a detected signal representative of the signal outputted by the switching unit and a communication module for receiving and transmitting the detected signal to the processing unit.

In one embodiment the detection module comprises an isolated current sensor for providing an indication of a current in the signal outputted by the switching unit and a closed-loop sensor for providing a signal indicative of a closed-loop in a circuit in which said intelligent switching unit is installed.

In another embodiment the detection module further comprises a central processing unit connected to the isolated current sensor and to the closed-loop sensor, the central processing unit receiving the indication of a current and the signal indicative of a closed-loop, further wherein the central processing unit generates the detected signal representative of the signal outputted by the switching unit using the indication of a current and the signal indicative of a closed-loop.

In yet another embodiment the intelligent switching unit further comprises a command indicator operatively connected to the central processing unit, the command indicator receiving an indication of the state of the intelligent switching unit from the central processing unit and providing an indication of the state to said user.

In yet another embodiment the indication of the state comprises a visual indication.

In another embodiment, the command indicator comprises a light emitting diode (LED).

In another alternative embodiment, the communication module comprises a transceiver.

In another alternative embodiment, the switching unit may be actuated between an "on" position and an "off" position by a user.

In yet another alternative embodiment, the switching unit may be further actuated to an "auto" position by the user; further wherein the intelligent switching unit comprises a command circuit adapted for controlling the switching unit, the command circuit operatively connected to the communication module and to an output of the switching unit, further wherein when the switching unit is in the "auto" position, the communication module receives a command signal to provide from the processing unit and provides a corresponding command signal to the command circuit.

In yet another alternative embodiment, the detection module further comprises a central processing unit connected to the command circuit and the communication module, the central processing unit further receiving the corresponding command signal from the communication module and providing the command signal to the command circuit.

In another alternative embodiment, the command circuit is adapted to operate one of a relay, a transistor, a silicon control rectifier (SCR), a TRIode for alternating current (TRIAC) and a metal-oxide-semiconductor field-effect transistor (MOSFET) using the command signal.

In yet another alternative embodiment, the transceiver is adapted to provide an identification of the intelligent switching unit to the processing unit.

In another alternative embodiment, the identification is created when the intelligent switching unit is installed in a circuit.

In another alternative embodiment, the identification is created when the intelligent switching unit is manufactured.

In yet another alternative embodiment, the processing unit comprises a remote processing unit.

In another alternative embodiment, the intelligent switching unit is connected to the remote processing unit using a data network.

The invention enables to perform an efficient monitoring of a switch since the detected signal is transmitted to a processing unit. The processing unit is then capable to handle any operation in response to the detected signal provided.

According to another embodiment there is provided a method for managing a switching unit located in a circuit loop from a remote processing unit, the switching unit having an input and an output, the method comprising receiving a signal provided by the switching unit at said output; generating a signal indicative of the received signal provided by the switching unit and transmitting the generated signal to the remote processing unit.

In an alternative embodiment, the method further comprises detecting a circuit loop status and providing a signal indicative of a corresponding circuit loop status, further wherein the generating of the signal indicative of the signal provided by the switching unit is made using the signal indicative of the corresponding circuit loop status.

In yet another embodiment, the method further comprises receiving a command signal from the remote processing unit and providing the received command signal to the output of the switching unit.

In another embodiment, the method further comprises providing an indication of a status of the switching unit using the generated signal indicative of the signal provided by the switching unit.

In yet another embodiment, the providing of said indication of a status comprises displaying a visual indication representative of the status.

According to another embodiment there is provided a farming automation system for enabling an operator to control at least one controllable farming equipment, the farming automation system comprising a controller, at least one intelligent switching unit, each of the at least one intelligent switching unit being connected to the controller, each of the at least one intelligent switching unit comprising a switching unit to be actuated by an operator, said switching unit operatively connected to a corresponding one of the at least one controllable farming equipment and a detection module connected to the switching unit, the detection module detecting a signal outputted by the switching unit and providing a detected signal representative of the signal outputted by the switching unit and a communication module connected to the detection module for receiving and transmitting the detected signal to the controller.

In one embodiment, the farming automation system further comprises a network interface module connected to the controller and to each of the at least one intelligent switching unit.

In yet another embodiment, a corresponding one of the at least one switching unit of a corresponding intelligent switching unit may be further actuated to an "auto" position; the corresponding intelligent switching unit comprises a corresponding command circuit operatively connected to a corresponding communication module and to an output of the corresponding switching unit, and when the corresponding switching unit is in the "auto" position, the corresponding communication module receives a command signal to provide from the controller and provides a corresponding command signal to provide to the corresponding command circuit.

BRIEF DESCRIPTION OF THE DRAWINGS

In order that the invention may be readily understood, embodiments of the invention are illustrated by way of example in the accompanying drawings.

Further details of the invention and its advantages will be apparent from the detailed description included below.

DETAILED DESCRIPTION

In the following description of the embodiments, references to the accompanying drawings are by way of illustration of an example by which the invention may be practiced. It will be understood that other embodiments may be made without departing from the scope of the invention disclosed.

Figure 1:
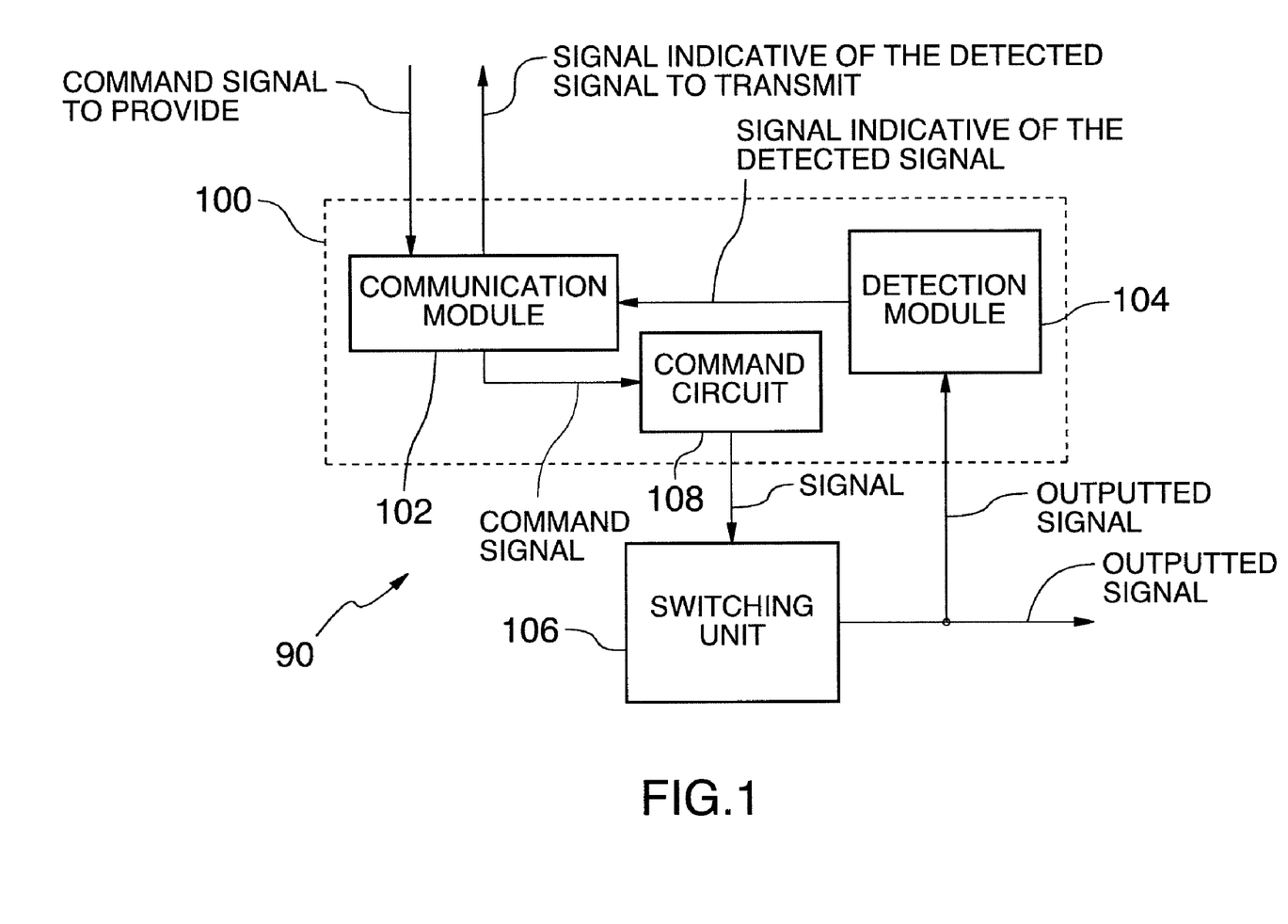
FIG. 1 is a block diagram which shows one embodiment of an intelligent switching unit; the intelligent switching unit comprises a switching unit, a communication module and a detection module.

Now referring to FIG. 1, there is shown an embodiment of an intelligent switching unit 90. In this embodiment, the intelligent switching unit 90 comprises a communicating interface 100 and a switching unit 106.

The communicating interface 100 comprises a communication module 102, a detection module 104 and a command circuit 108.

The switching unit 106 provides an output signal indicative of a state such as "on" or "off" for instance. The switching unit 106 may be actuated by a user. It will be appreciated that in another embodiment, the switching unit 106 may be actuated automatically. Moreover, the skilled addressee will appreciate that the switching unit 106 is installed in a circuit loop. Moreover, it will be appreciated that alternatively the output of the switching unit 106 may be a value located between two values such as zero and one hundred percent when in "auto" mode.

The detection module 104 is connected to the switching unit 106. More precisely, the detection module 104 detects a signal outputted by the switching unit 106 and provides a detected signal representative of the signal outputted by the switching unit 106. The detected signal indicative of the outputted signal is provided by the detection module 104 to the communication module 102.

The communication module 102 is connected to the detection module 104. More precisely, the communication module 102 receives the signal indicative of the detected signal indicative of the outputted signal and transmits the detected signal to the processing unit, not shown.

It will be appreciated by the skilled addressee that the intelligent switching unit 90 disclosed in FIG. 1 is of great advantage since it is capable of providing an indication of the signal outputted by the switching unit 106. In fact, the intelligent switching unit 90 is capable of indicating whether the switching unit 106 is operating or not as well as it is capable of indicating in which state the switching unit 106 is which is of great advantage. The skilled addressee will appreciate that a low level (0) may be indicative of an off position of the switching unit 106. The low level (0) may also be indicative of a defective switching unit 106. Transmitting an indication of the signal outputted is therefore of great advantage.

In a preferred embodiment, and as mentioned earlier, the signal indicative of the detected signal is provided by the communication module 102 to a processing unit, not shown in FIG. 1. In one embodiment the processing unit comprises a remote processing unit. Still in one embodiment, the communication module 102 is connected to the remote processing unit using a data network.

Still referring to FIG. 1, it will be appreciated that in one embodiment the communicating interface 100 may further comprise the command circuit 108.

In such embodiment, the command circuit 108 is operatively connected to the communication module 102 and to the switching unit 106. Still in this embodiment, the communication module 102 is adapted to receive a command signal to provide from a remote processing unit, not shown. A corresponding command signal is provided to the command circuit 108 which in turns provides a signal to the switching unit 106. It will be appreciated by the skilled addressee that this is of great advantage in order to remotely control the switching unit 106. Moreover, the skilled addressee will appreciate that the command signal to provide provided by the remote processing unit may be generated or not in response to a given signal indicative of the detected signal. For instance, in the case of a detected failure, a specific command signal may be provided.

Figure 2:
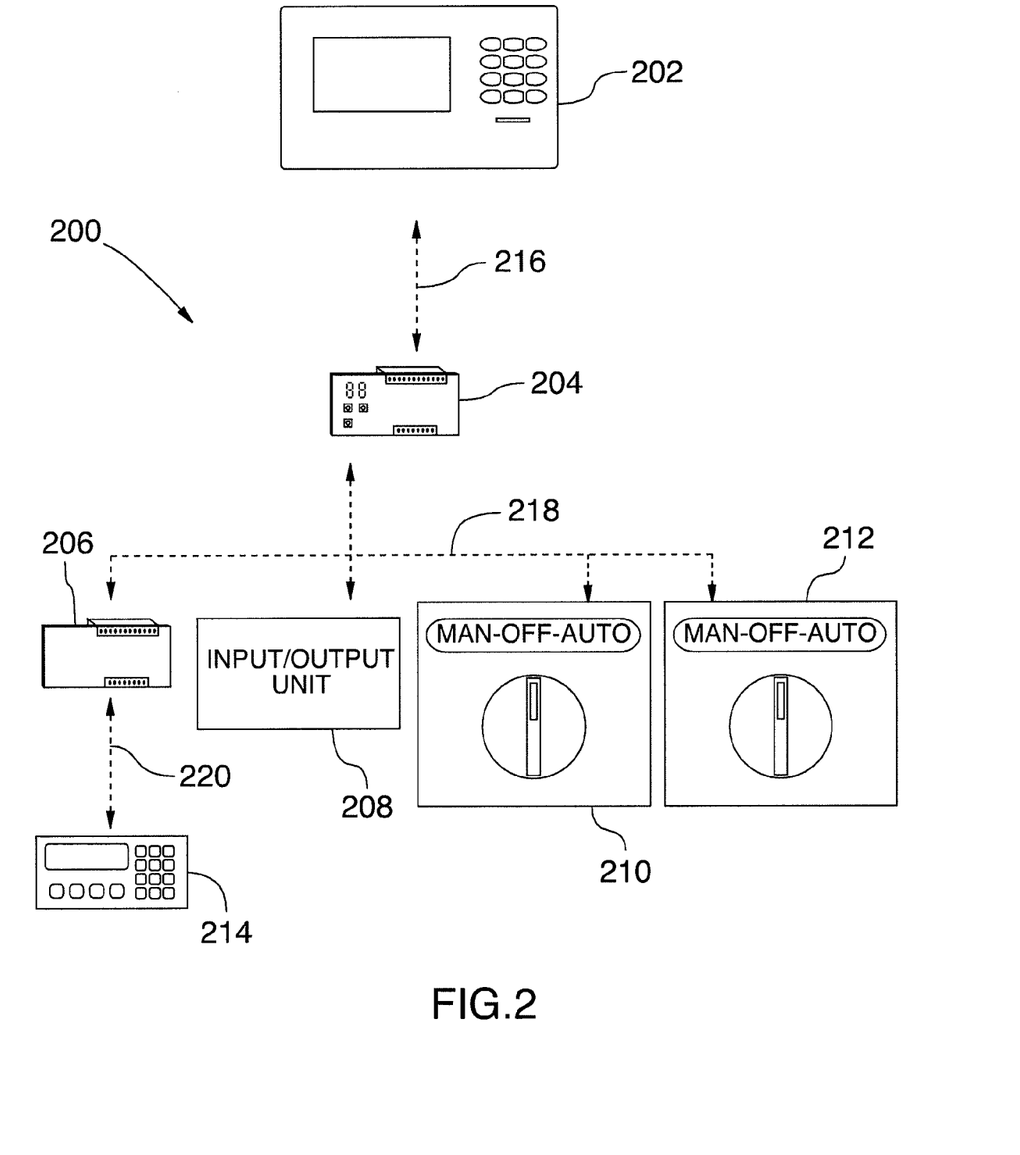
FIG. 2 is a diagram which shows one embodiment in which at least one intelligent switching unit may be advantageously used.

Now referring to FIG. 2, there is shown one embodiment where at least one intelligent switching unit is advantageously used. More precisely, FIG. 2 discloses an embodiment of a farming automation system 200. The farming automation system 200 is used for enabling an operator to control at least one (controllable) farming equipment.

More precisely, the farming automation system 200 comprises a main controller 202, a network interface module 204, a network interface module 206, an input/output unit 208, a first intelligent switching unit 210, a second intelligent switching unit 212, and a weight scale 214. It will be appreciated by the skilled addressee that various other embodiments or configurations may be provided for the farming automation system 200 other than the one disclosed in FIG. 2, which is merely exemplary. For instance, the farming automation system 200 may comprise the main controller 202 and at least one intelligent switching unit.

More precisely and still referring to FIG. 2, the main controller 202 is connected to the network interface 204 using a first communication network 216 while the network interface module 204 is connected to the network interface module 206, to the input/output unit 208, to the first intelligent switching unit 210 and to the second intelligent switching unit 212 using a second data network. Finally, the network interface module 206 is connected to the weight scale 214 using a third communication network.

In one embodiment, the first communication network 216 is a proprietary communication protocol, while the second communication network 218 comprises a RS-485 network and the third communication network 220 comprises a proprietary communication protocol.

The main controller 202 is used as an interface between an operator and all the apparatuses of the farming automation system 200 connected to it e.g. the controllable farming equipment. It will further be appreciated that the main controller 202 also executes programmed sequences, monitors and controls any machinery connected to the networks by gathering and sending different control information to any module to which the main controller 202 is connected to. It will be appreciated by the skilled addressee that various embodiments of the main controller 202 may be provided. In one embodiment, the main controller 202 is UCC800 manufactured by JPS Electronique.

It will be appreciated that the network interface module 204 as well as the network interface module 206 are used for enabling a given equipment to access different types of network without the need for modifying hardware or software within an equipment. In one embodiment, the network interface module 204 is a RS485 Master Communication module manufactured by JPS Electronique. In one embodiment, the network interface module 206 is a RS485 Slave Communication module manufactured by JPS Electronique.

While it has been shown that some type of data network may be used, it will be understood by the skilled addressee that various other types of communication networks may be used such as RF network, DeviceNet network, or the like.

The input/output unit 208 is used to connect an equipment to the main controller 202 via the first network 216 and the second network 218. In one embodiment, the input/output unit 208 is model VENT02 manufactured by JPS Electronique.

Each of the first intelligent switching unit 210 and the second intelligent switching unit 212 are used to operate a corresponding controllable farming equipment, not shown.

It will be appreciated that in one embodiment, the controllable farming equipment may be selected from a group consisting of conveyors, motors, actuators, lighting or the like.

It will be appreciated that each of the first intelligent switching unit 210 and the second intelligent switching unit 212 may be positioned in any one of a "manual" position, an "off" position and an "auto" position. In the "manual" position (or "on" position), the corresponding controllable farming equipment to which the intelligent switching unit is connected to is actuated, while in the "off" position, the corresponding controllable farming equipment to which the intelligent switching unit is connected to is not operative and finally in the "auto" position, the corresponding controllable farming equipment to which the intelligent switching unit is connected to is subject to a sequence provided by the main controller 202.

The skilled addressee will appreciate that each of the first intelligent switching unit 210 and the second intelligent switching unit 212 may be switched alternatively between other positions. As explained further below each of the first intelligent switching unit 210 and the second intelligent switching unit 212 is capable of providing a detected signal of its corresponding position. In a preferred embodiment, the detected signal is provided to the main controller 202. The skilled addressee will appreciate that this is of great advantage since it enables the main controller 202 to know in which position each of the first intelligent switching unit 210 and the second intelligent switching unit 212 is. This may be of great use for instance in the case where the first intelligent switching unit 210 and the second intelligent switching unit 212 are used for controlling controllable farming equipment for which an emergency sequence is required to be performed in case of a failure. It will therefore be appreciated that this greatly enhance the robustness of the main controller 202 of the farming automation system 200 connected to it.

The weight scale 214 is used to weigh an element and is connected to the network interface module 206 via the third communication network 220. In one embodiment, the weight scale 214 is WS600 manufactured by JPS Electronique.

The skilled addressee will appreciate that FIG. 2 shows an embodiment where intelligent switching units are advantageously used. It will be appreciated that an intelligent switching unit may be further used in various other applications. For instance, the intelligent switching unit may be used in complex automated systems, in a factory, for home automation or the like. In all those applications, the providing of a signal indicative of the signal outputted by the switching unit is of great advantage since it enhances the reliability of an application as well as it enables the providing of emergency procedures or routines in response to the detection of a failure signal.

Figure 3A:
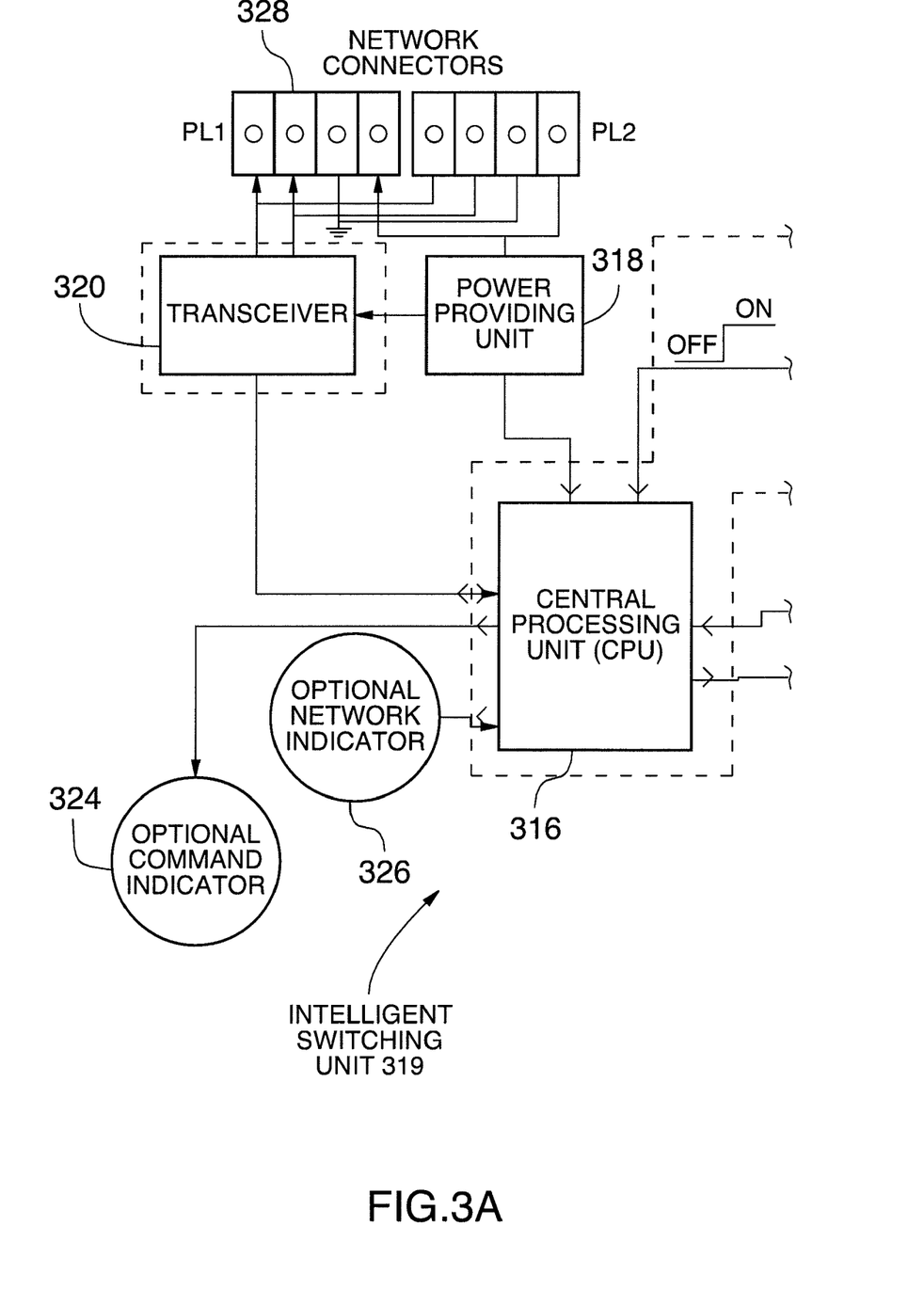
FIG. 3a is a block diagram which shows a first part of one embodiment of an intelligent switching unit.
Figure 3B:
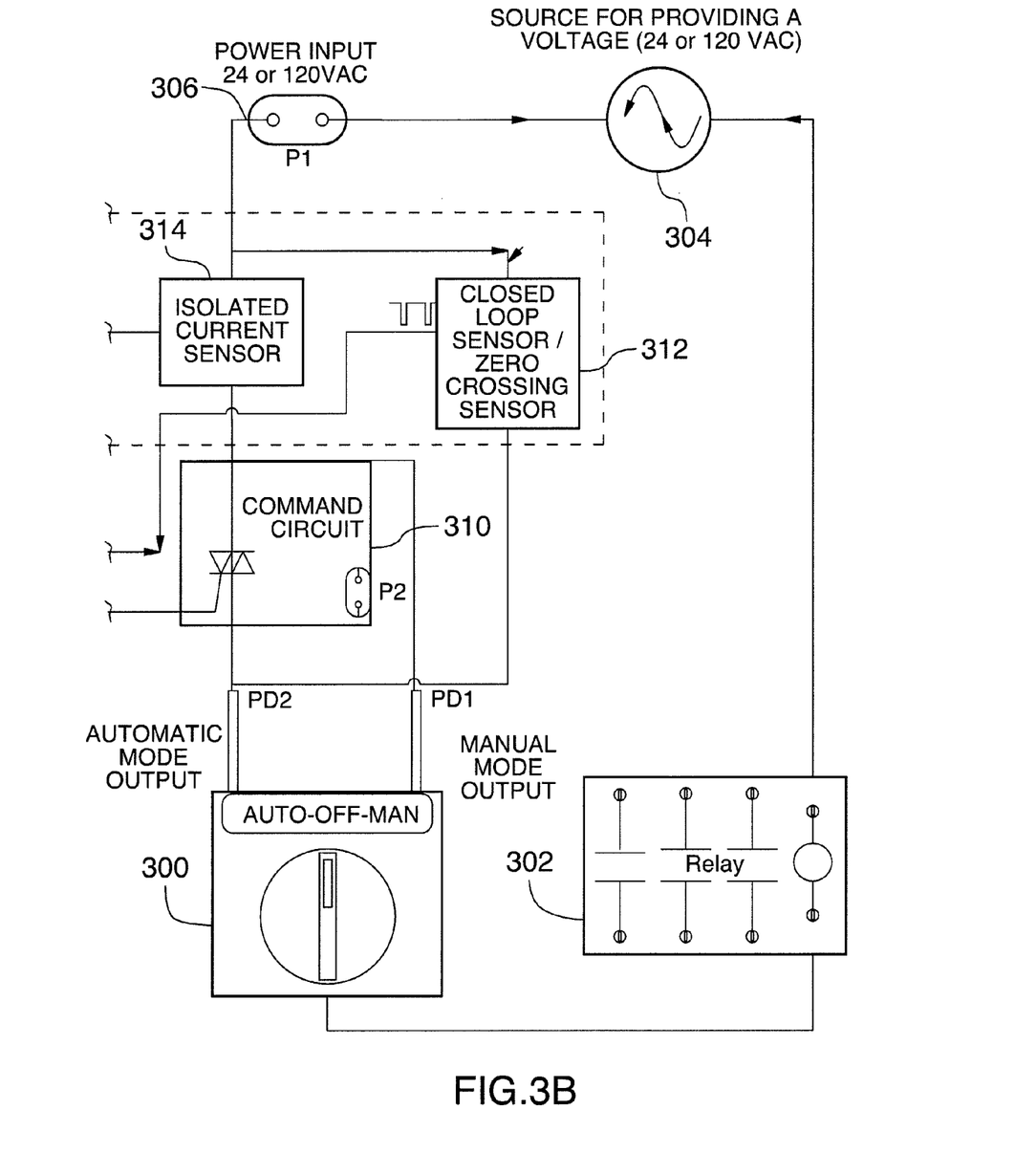
FIG. 3b is a block diagram which shows a second part of one embodiment of an intelligent switching unit.

Now referring to FIGS. 3a-3b, there is shown one embodiment of an intelligent switching unit 319.

The intelligent switching unit 319 comprises a transceiver 320, a power providing unit 318, an isolated current sensor 314, a closed-loop sensor/zero crossing sensor 312, a central processing unit 316, an optional command indicator 324, an optional network indicator 326 and a switching unit 300.

The intelligent switching unit 319 is connected to a plurality of network connectors 328 via the transceiver 320.

As shown in FIGS. 3a-3b, the intelligent switching unit 319 is integrated in a circuit loop comprising a power input 306, a source for providing a voltage 304 and a relay 302.

The relay 302 receives a signal provided by the source for providing a voltage 304 depending on the position of the switching unit 300. In the case where the switch 300 is in the "off" position, the relay 302 does not receive any power from the source for providing a voltage 304 while in the case where the switching unit 300 is in the "manual" position, the relay 302 receives a power signal from the source for providing a voltage 304.

Finally, in the case where the switching unit 300 is in the "auto" position, the relay 302 receives a signal from the source for providing a voltage 304 according to a current sequence.

The intelligent switching unit 319 is operatively connected to the main controller 202 via the plurality of network connectors 328.

More precisely, the transceiver 320, which is an embodiment of a communication module, uses an RS-485 serial bus transceiver to connect to a data network via the plurality of network connectors 328. In one embodiment, up to thirty-two (32) circuits controlled by an intelligent switching unit may be connected to the data network. Alternatively, other embodiments may be provided.

Still in this embodiment, the data network uses a master/slave topology on a proprietary communication protocol. According to this protocol each intelligent switching unit comprises a unique Media Access Control (MAC) Identification having a number comprised between one (1) and thirty-two (32) in one embodiment.

The main controller 202 may, in one embodiment, scan each intelligent switching unit connected to the network ten (10) times per second in order to send a required state and retrieve an actual state from any intelligent switching unit connected to the network.

As mentioned previously, it will be appreciated that various types of modules may also be connected to a same network using network interface module. It will be appreciated that in an alternative embodiment, the physical layer of the data network may be Radio Frequency (RF), Controller Area Network (CAN), Ethernet, PowerLine, or the like. The communication protocol may also be a standard protocol, such as DeviceNet, ModBus, TCP/IP, Ethernet/IP, Bluetooth, ZigBee, or the like.

The power providing unit 318 provides a 12-Volt DC signal which is provided using communication wires in one embodiment. Still in this embodiment, an onboard regulator provides the five (5) Volts DC power necessary for the communication of all digital circuits.

The isolated current sensor 314 is used to detect a current in the signal provided by the switching unit 300. More precisely and in the embodiment disclosed in FIGS. 3a-3b, when an electrical current is present on the line, a differential voltage is created through four diodes which activates an optocoupler and transmits an opto-isolated control signal (on/off) to the central processing unit 316, in one of the embodiments. The skilled addressee will appreciate that detecting current may be of great advantage since it helps validating that the controlled machinery is running.

The closed-loop sensor and the zero-crossing sensor 312 operate as follows.

The closed-loop sensor is used for providing a signal indicative of a closed-loop in a circuit (also referred to as a signal indicative of a corresponding circuit loop status) in which the intelligent switching unit is installed. More precisely and in the embodiment disclosed in FIGS. 3a-3b, in the case where the load is not activated, a small current, which is an embodiment of a signal indicative of a closed-loop, is allowed to pass through the closed-loop sensor and a corresponding control signal (e.g. on/off) is transmitted to the central processing unit 316. If a failure occurs anywhere in the control loop, such as if the switching unit 300 is off, if there is an overload, if a breaker interrupts or a fuse melts, or a wire is disconnected, or the like, the central processing unit 316 sends this information to the main controller 202. It will be appreciated by the skilled addressee that such system enables a self-verification without the need of starting any other equipment.

The zero-crossing sensor comprises a circuit made up of an optocoupler, a transistor as well as three resistances, in one embodiment, in order to generate a square wave form having rapid zero pulses which represent the zero-crossing of the sinusoidal waveform in one embodiment.

It will be appreciated by the skilled addressee that this enables the activation of the load during the zero crossing which reduces inrush and electro-magnetic noise on the control circuit.

The central processing unit 316 comprises in one embodiment a microchip Programmable Intelligent Computer (PIC) microcontroller manufactured by Microchip. Alternatively, many other embodiments may be provided such as a microprocessor or a Field Programmable Gate Array (FPGA).

The central processing unit 316 manages, in one embodiment, the command circuit 310, the network indicator 326, the command indicator 324 and the communication protocol. In an alternative embodiment, an alternative central processing unit 316 may be substituted to the microcontroller-based central processing unit.

The command indicator 324 is operatively connected to the central processing unit 316 and receives an indication of the state of the intelligent switching unit 316 from the central processing unit 316 and provides an indication of the state to the user. In one embodiment, the indication comprises a visual indication. In one embodiment, the command indicator 324 comprises a light-emitting diode (LED) type indicator which is used in order to notify a user of the state of the intelligent switching unit 319.

It will be appreciated by the skilled addressee that the command indicator 324 is optional.

It will be appreciated that the command indicator 324 may operate according to various embodiments. In one embodiment, a solid "on" may be used to indicate that the load is running in an "automatic" or a "manual" mode. Still in one embodiment, a solid "off" may be used to indicate that the load is "off". Still in this embodiment, a flashing light-emitting diode (LED) may be used to indicate that the load should be running but the circuit has detected a problem and finally, a rapid flashing may be used to indicate that the system is in a programming mode and the intelligent switching unit 319 has not yet received its identification (ID).

The network indicator 326 is operatively connected to the central processing unit 316 and is used to provide an indication of the network activity. In one embodiment, the indication comprises a visual indication. Still in one embodiment, the network indicator 326 comprises in one embodiment a light-emitting diode (LED) which may be used as an indicator for network activity. It will be appreciated that the network indicator 326 is optional. It will be further appreciated by the skilled addressee that the light may be activated each time the switching unit 300 is polled by the main controller 202 in one embodiment.

The command circuit 310 is operatively connected to the central processing unit 316 and is adapted for controlling the switching unit 300. The command circuit 310 is connected to an output of the switching unit 300. It will be appreciated that the command circuit 310 is adapted to receive a command signal from the processing unit, not shown, and to provide a corresponding command signal to the output of the switching unit 300. It will be appreciated that the command circuit 310 may be used to activate a relay, a transistor, a silicon control rectifier (SCR), a TRIode for Alternating Current (TRIAC), a metal-oxide-semiconductor field-effect transistor (MOSFET), or the like depending on the type of load to be controlled.

It will be appreciated that a circuit, such as the intelligent switching unit 319, may be identified on a data network according to various embodiments as disclosed herein below.

According to a first step, a Master Network Interface Module may be put into an identification (MAC ID) programming mode by an installer, such as an operator.

According to a second step, the Master Network Interface Module may send a "mode change" message to all the circuits located on the network.

According to a third step, the Master Network Interface Module may display the next identification (ID) to be programmed. The installer may then press an installation button on the intelligent switching unit 319 in order to associate the active identification (ID) to that circuit and according to a last step, the identification (ID) may be automatically incremented and the installer may repeat the third step for each intelligent switching unit be located on the data network.

It will be appreciated that the identification (ID) of the intelligent switching unit 319 on the network may be provided according to various other embodiments depending for instance on the physical layer of the network and the communication protocol used. For instance, each intelligent switching unit may be manufactured with a distinct identification (ID) (e.g. a serial number). During the installation, the main controller 202 may then display the list of circuits and the installer may link a tag to each intelligent switching unit's serial number.

Now referring to FIGS. 4a-4d, there is shown an electrical diagram of an embodiment of the intelligent switching unit shown in FIGS. 3a-3b.

Figure 4A:
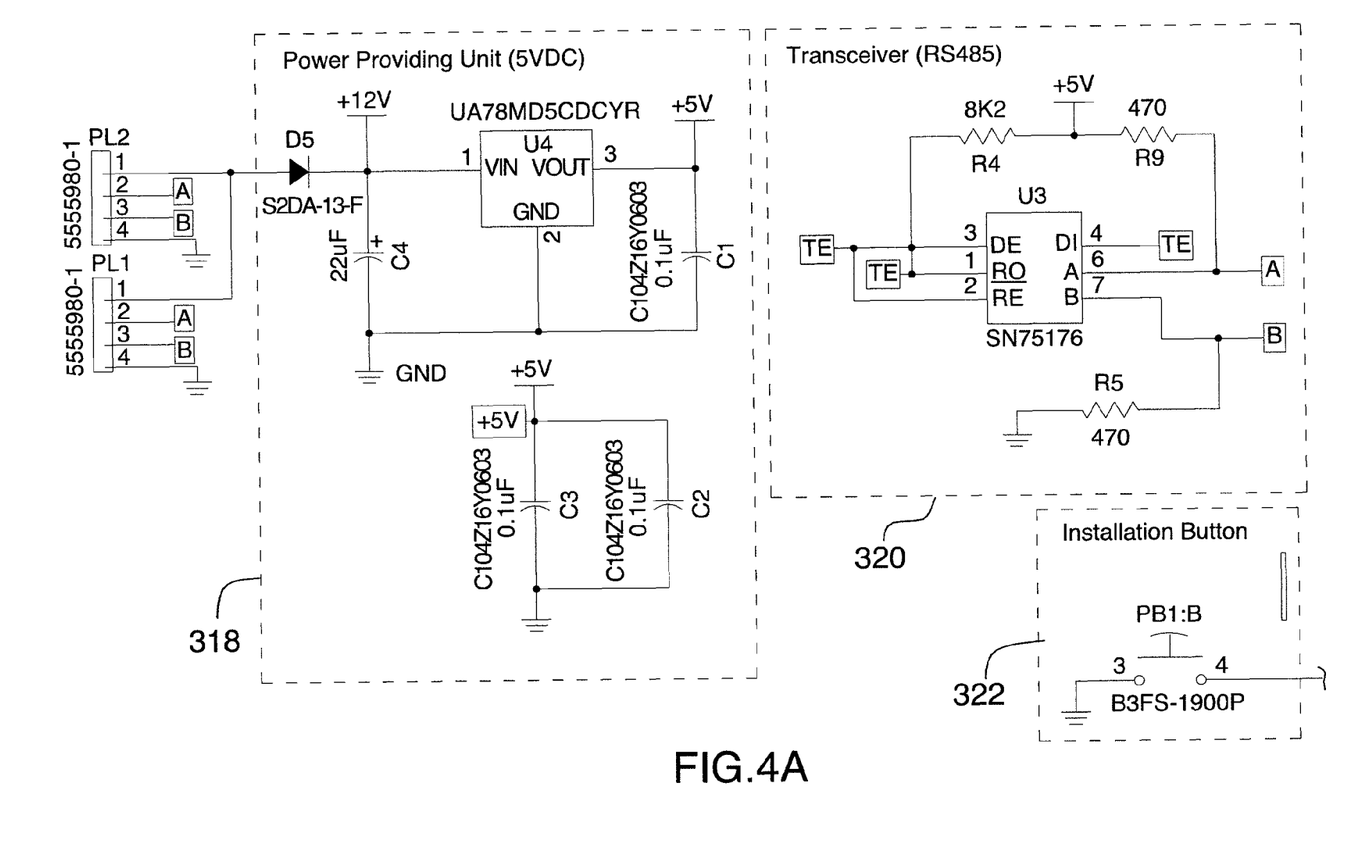
FIG. 4a is an electrical diagram which shows one embodiment of a power providing unit, a transceiver and an installation button of an intelligent switching unit.

Referring to FIG. 4a, there are shown an embodiment of the power providing unit 318, the transceiver 320 and the installation button 322.

Figure 4B:
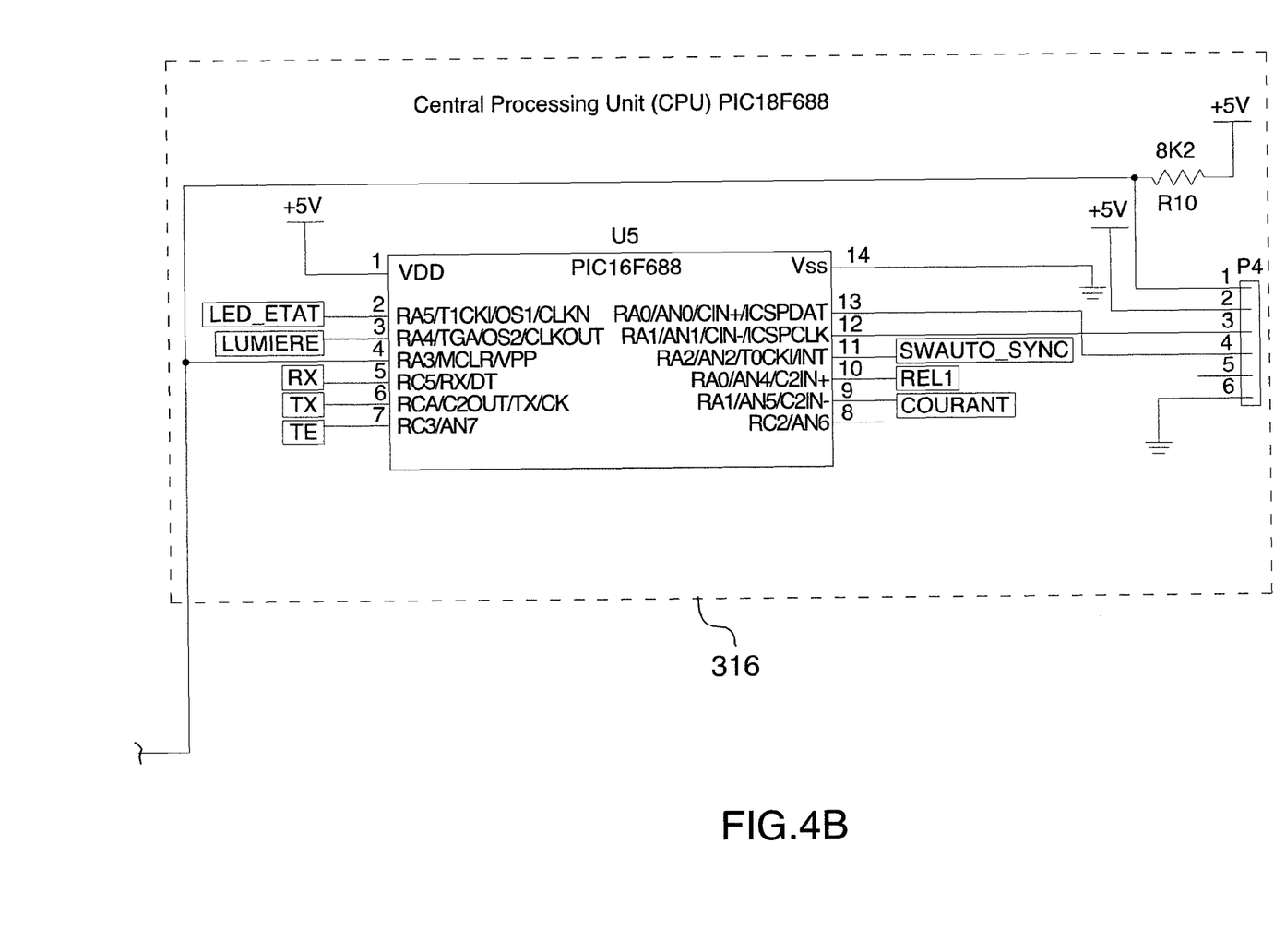
FIG. 4b is an electrical diagram which shows one embodiment of a central processing unit of an intelligent switching unit.

Referring to FIG. 4b, there is shown an embodiment of the central processing unit 316.

Figure 4C:
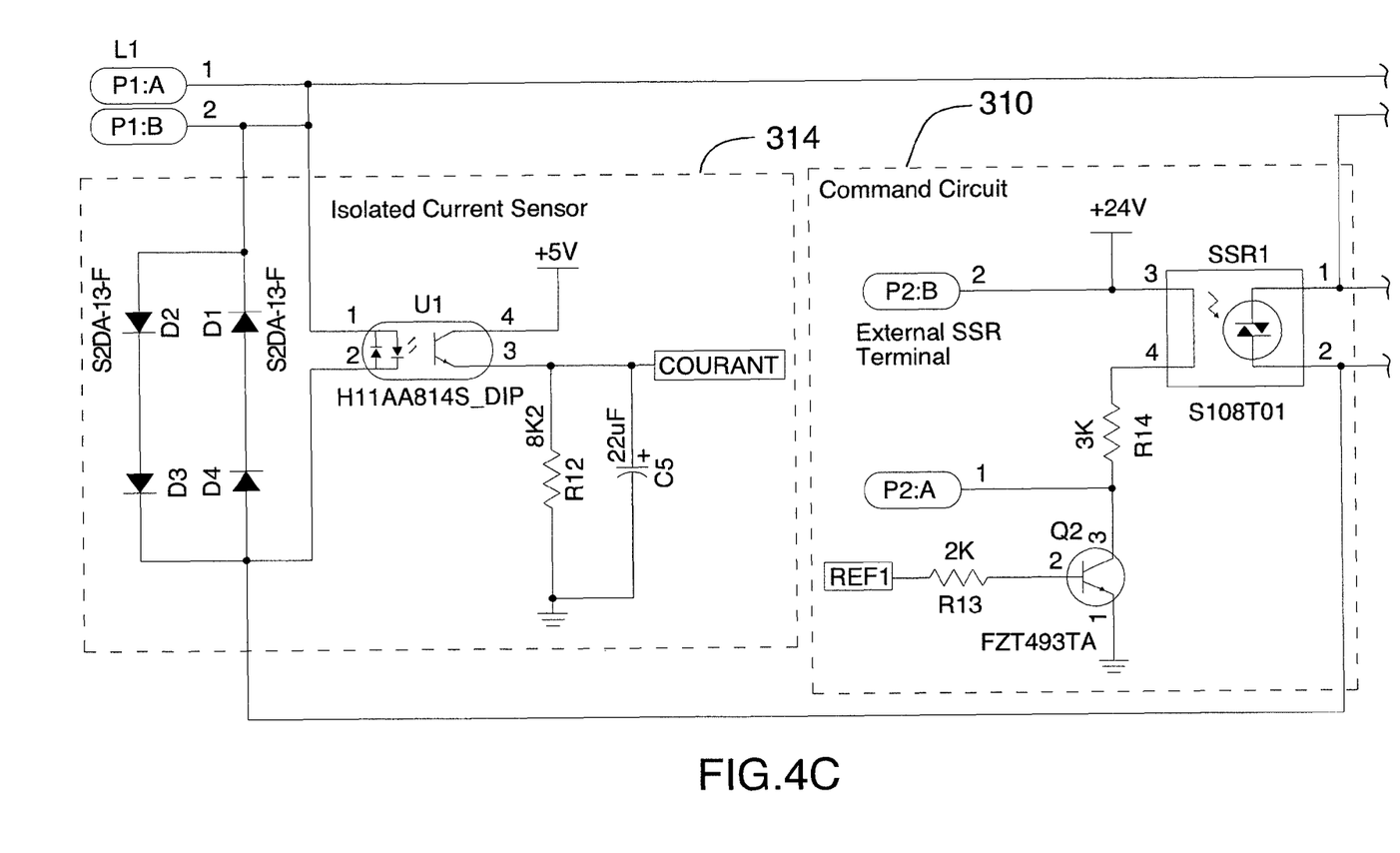
FIG. 4c is an electrical diagram which shows one embodiment of an isolated current sensor and a command circuit of an intelligent switching unit.

For instance, there are shown in FIG. 4c an embodiment of the command circuit 310 and the isolated current sensor 314.

Figure 4D:
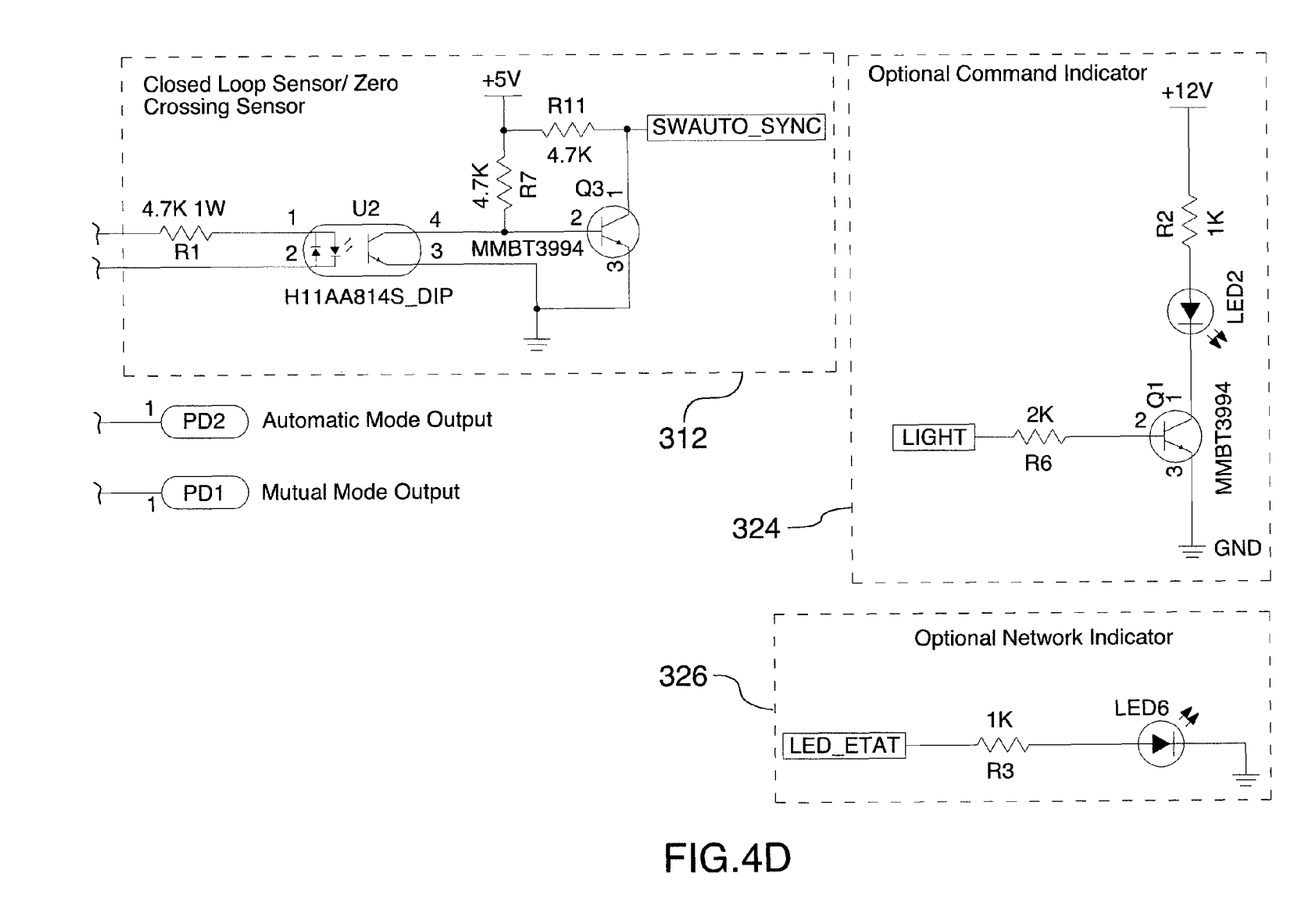
FIG. 4d is an electrical diagram which shows one embodiment of a closed-loop sensor and a zero-crossing sensor, an optional command indicator and an optional network indicator of an intelligent switching unit.

Now referring to FIG. 4d, there are shown an embodiment of the closed-loop sensor and the zero-crossing sensor 312, the optional command indicator 324 and the optional network indicator 326.

The skilled addressee will appreciate that the embodiment disclosed in FIGS. 4a-4d is merely exemplary and that various other embodiments may be disclosed.

Figure 5:
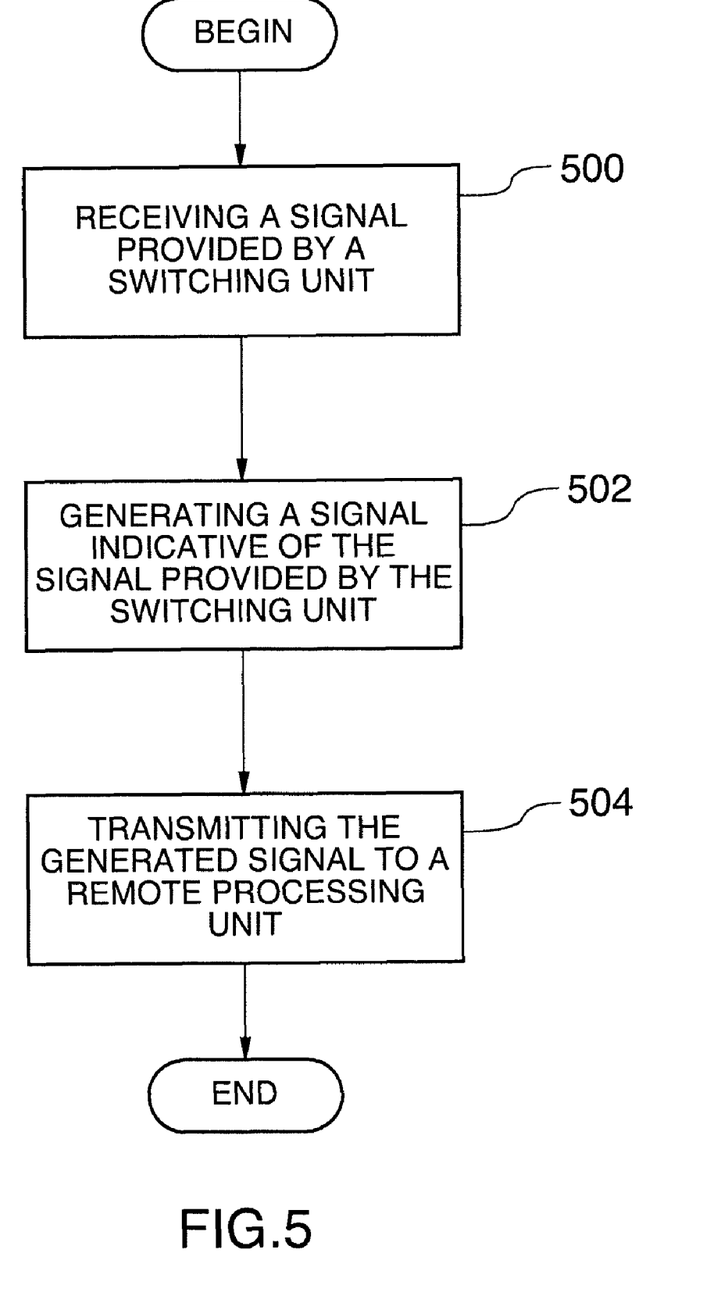
FIG. 5 is a flow chart which shows an embodiment of a method for managing an intelligent switching unit.

Now referring to FIG. 5, there is shown an embodiment of a method for managing an intelligent switching unit located in a circuit loop from a remote processing unit, the switching unit having an input and an output.

According to processing step 500, a signal provided by a switching unit is received. In one embodiment, the signal is received at the output of the switching unit.

According to processing step 502, a signal indicative of the received signal provided by the switching unit is generated.

According to processing step 504, the generated signal is transmitted to a remote processing unit. It will be appreciated by the skilled addressee that the generated signal may be transmitted to the remote processing unit via a network or the like.

It will be appreciated that the method may further comprise detecting a circuit loop status and providing a signal indicative of a corresponding circuit loop status, wherein the generating of the signal indicative of the signal provided by the switching unit is made using the signal indicative of the corresponding circuit loop status.

Moreover, it will be appreciated that the method may further comprise providing an indication of a status of the switching unit using the generated signal indicative of the signal provided by the switching unit. The providing of the indication of a status may comprise displaying a visual indication representative of the status.

As mentioned above, it will be appreciated by the skilled addressee that the intelligent switching unit disclosed herein may be used in various embodiments that are not limited to farming automation systems. In particular, the intelligent switching unit may be used in the case of a plurality of switches connected together using a data network. For instance the intelligent switching unit may be used in a home automation system to control if a user has properly actuated or not certain switches. It has been contemplated that the feedback provided by the intelligent switching unit to a remote processing unit may add a lot of values in home automation. Since may operations can be based on present or past switching states.

Although the above description relates to a specific preferred embodiment as presently contemplated by the inventor, it will be understood that the invention in its broad aspect includes mechanical and functional equivalents of the elements described herein.

The invention claimed is:

1. An intelligent switching unit to be connected with a processing unit, the intelligent switching unit comprising:
   a switching unit to be actuated by a user;
   a detection module connected to the switching unit, the detection module detecting a signal outputted by the switching unit and providing a detected signal representative of the signal outputted by the switching unit; and
   a communication module connected to the detection module for receiving and transmitting the detected signal to the processing unit.

2. The intelligent switching unit as claimed in claim 1, wherein said detection module comprises:
   an isolated current sensor for providing an indication of a current in the signal outputted by the switching unit; and
   a closed-loop sensor for providing a signal indicative of a closed-loop in a circuit in which said intelligent switching unit is installed.

3. The intelligent switching unit as claimed in claim 2, wherein said detection module further comprises a central processing unit connected to the isolated current sensor and to the closed-loop sensor, said central processing unit receiving said indication of a current and said signal indicative of a closed-loop, further wherein said central processing unit generates said detected signal representative of the signal outputted by the switching unit using said indication of a current and said signal indicative of a closed-loop.

4. The intelligent switching unit as claimed in claim 3, further comprising a command indicator operatively connected to the central processing unit, said command indicator receiving an indication of the state of the intelligent switching unit from the central processing unit and providing an indication of said state to said user.

5. The intelligent switching unit as claimed in claim 4, wherein said indication of said state comprises a visual indication.

6. The intelligent switching unit as claimed in claim 5, wherein said command indicator comprises a light emitting diode (LED).

7. The intelligent switching unit as claimed in claim 1, wherein said communication module comprises a transceiver.

8. The intelligent switching unit as claimed in claim 7, wherein said transceiver is adapted to provide an identification of the intelligent switching unit to said processing unit.

9. The intelligent switching unit as claimed in claim 8, wherein said identification is created when said intelligent switching unit is installed in a circuit.

10. The intelligent switching unit as claimed in claim 8, wherein said identification is created when said intelligent switching unit is manufactured.

11. The intelligent switching unit as claimed in claim 1, wherein said switching unit is actuated between one of an "on" position and an "off" position by said user.

12. The intelligent switching unit as claimed in claim 1, wherein said switching unit further comprises an "auto" position; further wherein said intelligent switching unit comprises a command circuit adapted for controlling said switching unit, said command circuit operatively connected to the communication module and to an output of the switching unit, further wherein when said switching unit is in said "auto" position, said communication module receives a command signal to provide from the processing unit and provides a corresponding command signal to the command circuit.

13. The intelligent switching unit as claimed in claim 12, wherein said detection module further comprises a central processing unit connected to the command circuit and the communication module, said central processing unit further receiving said corresponding command signal from said communication module and providing said command signal to said command circuit.

14. The intelligent switching unit as claimed in claim 13, wherein said command circuit is adapted to operate one of a relay, a transistor, a silicon control rectifier (SCR), a TRIode for alternating current (TRIAC) and a metal-oxide-semiconductor field-effect transistor (MOSFET) using said command signal.

15. The intelligent switching unit as claimed in claim 1, wherein said processing unit comprises a remote processing unit.

16. The intelligent switching unit as claimed in claim 15, wherein said intelligent switching unit is connected to the remote processing unit using a data network.

17. A farming automation system for enabling an operator to control at least one controllable farming equipment, the farming automation system comprising:
   a controller;
   at least one intelligent switching unit, each of the at least one intelligent switching unit being connected to the controller, each of the at least one intelligent switching unit comprising:
   a switching unit to be actuated by an operator, said switching unit operatively connected to a corresponding one of the at least one controllable farming equipment; and
   a detection module connected to the switching unit, the detection module detecting a signal outputted by the switching unit and providing a detected signal representative of the signal outputted by the switching unit; and
   a communication module connected to the detection module for receiving and transmitting the detected signal to the controller.

18. The farming automation system as claimed in claim 17, further comprising a network interface module connected to the controller and to each of the at least one intelligent switching unit.

19. The farming automation system as claimed in claim 17, wherein a corresponding one of the at least one switching unit of a corresponding intelligent switching unit further comprises an "auto" position; further wherein said corresponding intelligent switching unit comprises a corresponding command circuit operatively connected to a corresponding communication module and to an output of the corresponding switching unit, further wherein when said corresponding switching unit is in said "auto" position, said corresponding communication module receives a command signal to provide from the controller and provides a corresponding command signal to provide to the corresponding command circuit.

* * * * *